United States Patent [19]

Perobelli et al.

[11] Patent Number: 5,507,616
[45] Date of Patent: Apr. 16, 1996

[54] METHOD AND EQUIPMENT TO PALLETIZE PACKS OF SHEETS, BOOKS OR THE LIKE

[75] Inventors: Aldo Perobelli; Giorgio Pessina, both of Paderno Dugnano, Italy

[73] Assignee: O.M.G. di Giorgio Pessina e Aldo Perobelli S.n.c., Milan, Italy

[21] Appl. No.: 392,677

[22] Filed: Feb. 23, 1995

Related U.S. Application Data

[63] Continuation of Ser. No. 990,655, Dec. 14, 1992, abandoned.

[30] Foreign Application Priority Data

Mar. 24, 1992 [IT] Italy .................................. MI92A0688

[51] Int. Cl.[6] .................................................. B65G 57/03
[52] U.S. Cl. .......................... 414/789.5; 198/781.01; 198/781.05; 271/11; 271/107; 271/204; 414/786; 414/792.6; 414/792.9; 414/797
[58] Field of Search ................................ 198/781, 788; 414/786, 789.5, 792.6, 793.8, 797; 271/11, 107, 204

[56] References Cited

U.S. PATENT DOCUMENTS

| | | | |
|---|---|---|---|
| 3,902,609 | 9/1975 | Ohlsson | 414/792.6 X |
| 4,343,396 | 8/1982 | George | 198/781 |
| 4,534,462 | 8/1985 | Hoover et al. | 198/781 |
| 4,605,120 | 8/1986 | Vanderlinde et al. | 198/781 |
| 4,787,810 | 11/1988 | Cawley et al. | 414/789.5 X |
| 4,941,374 | 7/1990 | Focke | 83/13 |
| 5,060,785 | 10/1991 | Garrity | 198/781 |
| 5,098,254 | 3/1992 | Becicka et al. | 414/792.6 X |

FOREIGN PATENT DOCUMENTS 1178784  9/1964  Germany .

*Primary Examiner*—William E. Terrell
*Assistant Examiner*—Janice L. Krizek
*Attorney, Agent, or Firm*—Dann, Dorfman, Herrell and Skillman

[57] ABSTRACT

The palletization of packs (8) of sheets, books or the like is carried out through the conveyance of the packs (8), by a roller assembly (7) formed by powered rollers, in a programmed way stopping certain rollers beneath those packs (8) which are to be stopped in a programmed position and through the transfer and the putting down of the first row of packs (8) on a palletization stand (12) together with the picking up and the putting down of a separating sheet (10) on every complete layer of packs (8) formed on the palletization stand (12).

11 Claims, 3 Drawing Sheets

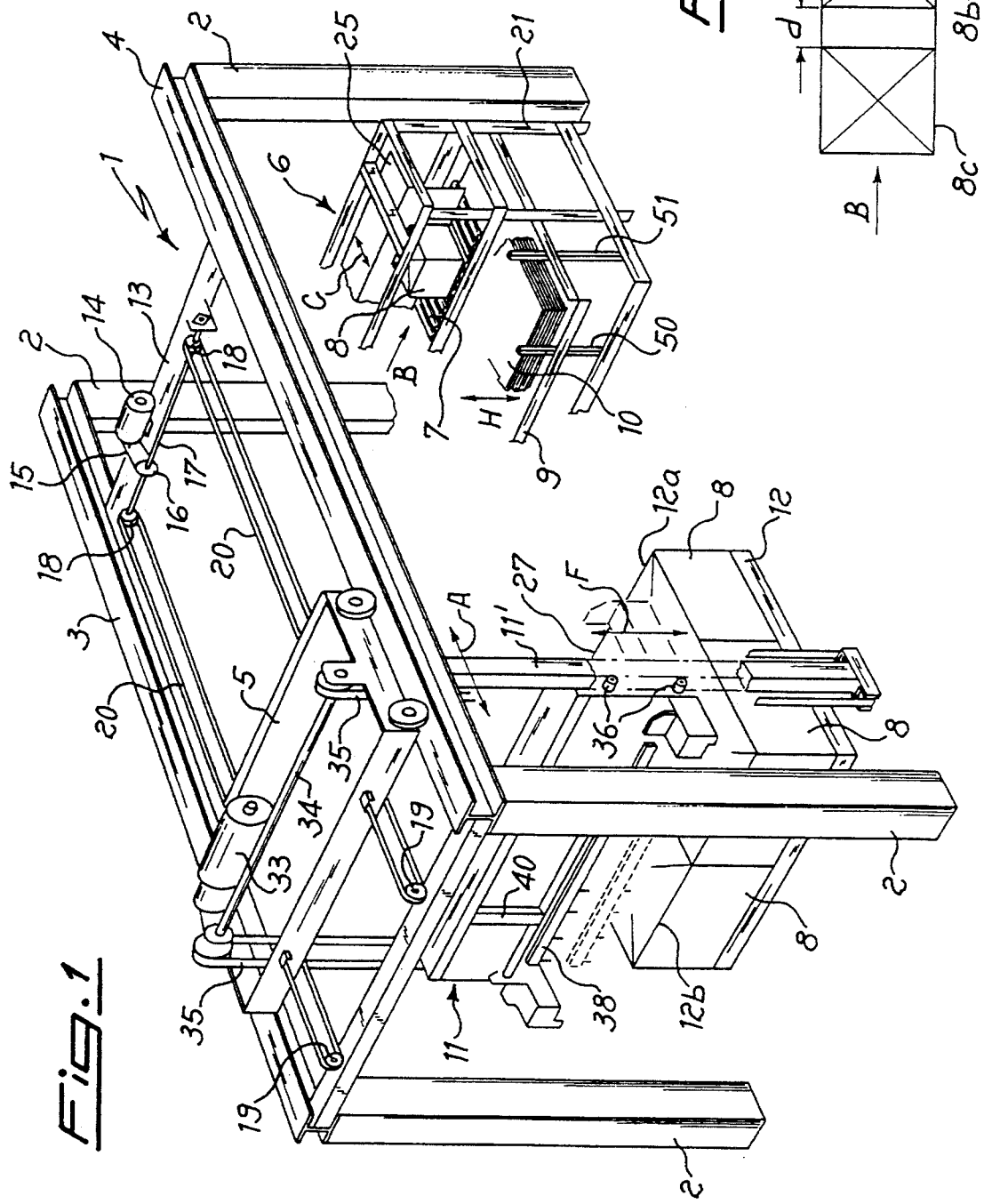

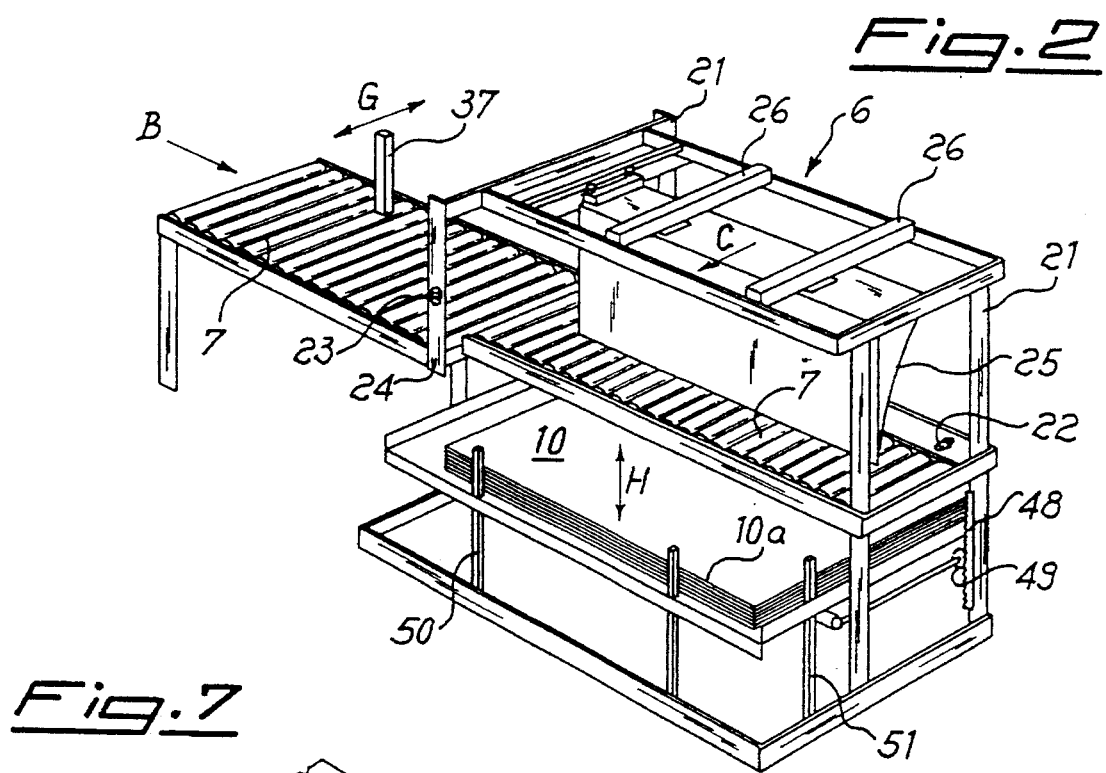
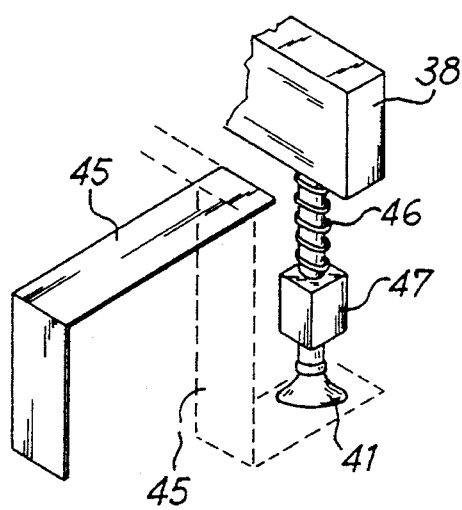
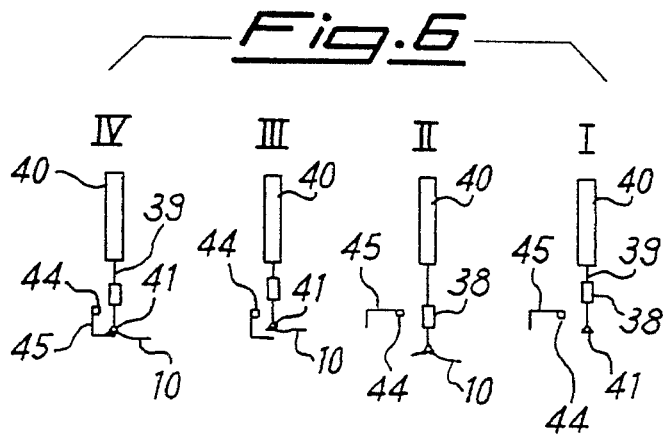

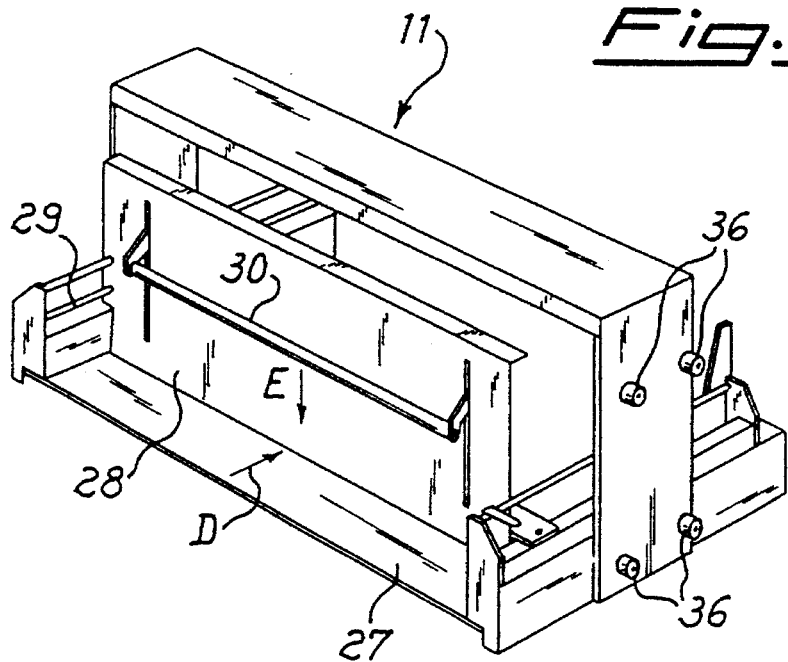
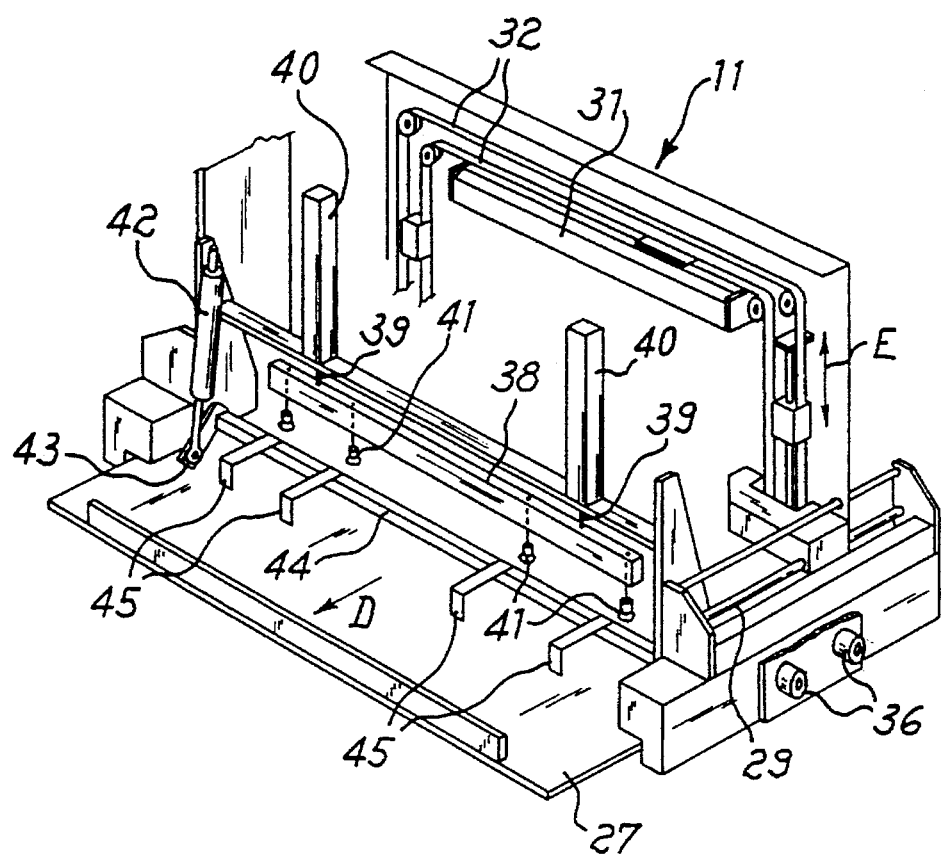

METHOD AND EQUIPMENT TO PALLETIZE PACKS OF SHEETS, BOOKS OR THE LIKE

This is a continuation of application Ser. No. 07/990,655, filed Dec. 14, 1992, now abandoned.

This invention concerns a method to palletize packs of sheets, books or the like including the steps of conveyance of the packs by means of a conveyor which conveys and positions successively the various rows of packs according to a prearranged disposition, and of horizontal transfer of each row of packs by means of a head from the conveyor to a loading plane which moves depositing successively on a palletization stand the rows of packs and forming a layer of the same, with the laying of a separating sheet between the complete layers of packs. The invention also concerns the equipment to carry out the aforesaid method.

About the above-mentioned subject the prior art refers to the German patent N. 1.178.784, for example, wherein the packs are conveyed by means of a conveyor and as a consequence of the formation of a row of said packs the motion of the latter is stopped raising the same by means of blades which interrupt the contact with the conveyor and thus cause the stopping of the row of packs. Subsequently each row of packs is picked up and put down on a palletization stand.

The above described known method has the drawback that said rows of packs can not be arranged in a programmed and automatic way, therefore a fundamental palletization operation is lacking. In the case of the prior art the different arrangements of the packs may be achieved by hand only, thus involving a great waste of time.

The U.S. Pat. No. 4,941,374 of the prior art describes an equipment for the palletization of cartons with the laying of a separating sheet between the layers of said cartons after the whole layer has been formed. As a matter of fact a single picking device is provided, which conveys both the cartons and the separating sheet on the palletization stand. This accomplishment has the drawback that the operation time is longer, since after finishing the layer of cartons a time must be added to pick up and put down the separating sheet.

The method and the equipment of this invention allow to get rid of the above-mentioned drawbacks with the characteristics and advantages which clearly appear from the following description of a preferred and non-limiting embodiment, referring to the annexed drawings wherein:

FIG.1 shows an overall perspective view of the equipment;

FIG.2 shows a perspective view of the pack conveyor;

FIG.3 shows a schematic view of a programmed arrangement of the packs on the conveyor;

FIG.4 shows a partial perspective view of the head with the pack loading plane;

FIG.5 shows a partial perspective view of the same head with the means to pick up a separating sheet;

FIG.6 shows a schematic view of the means to pick up the separating sheet in different positions;

FIG.7 shows an enlarged perspective view of a device to pick up the separating sheet.

With particular reference to FIG.1 the equipment according to this invention essentially includes: a framework 1 made up of four vertical posts 2 surmounted by the rails 3 and 4 on which a bogie 5 slides; a structure 6 on which is mounted a conveyor formed by a roller assembly 7 whose powered rollers successively convey the packs 8, and a stand 9 on which the separating sheets 10 are laid; and a head 11 which, properly moving horizontally and vertically, picks up the rows of packs arriving on the roller assembly 7 and the separating sheets 10 to convey them to the palletization stand 12 in the way described hereafter. Also referring to FIG.1, between the rails 3 and 4 a horizontal plane 13 is arranged, on which an electric motor 14 is mounted which, through the belt 15, drives the pulley 16 and therefore the shaft 17 mounted on it. The shaft 17 in turn drives the pulleys 18 and 19 connected to each other by the belts 20 fixed to the bogie 5. When the direction of rotation of the motor 14 changes said bogie 5 moves along the rails 3 and 4 in either direction according to the double-pointed arrow A. Said horizontal motion is transferred to the columns 11' which move integrally with the head 11.

Through said motion the head 11 takes a position adjacent to the structure 6 to receive successively the rows of packs conveyed by the roller assembly 7 according to the arrow B and to take them in the opposite direction to put them down on the palletization stand 12.

Now referring to FIG.2, the structure 6 is secured to the posts 2 by means of the vertical angle bars 21 and is provided, as already said, with the roller conveyor 7. Each roller forming the roller assembly is provided with a friction clutch 22 so that it may be automatically engaged or disengaged from its revolving motion which is driven by motors not shown in the drawing.

As shown in FIG.1 too, the packs 8 are fed on the roller assembly 7 according to the direction of the arrow B, so that the various packs successively pass before a sensor, for example a photocell 23 located on the vertical support 24 (FIG.2), so that the sensor, through an encoder or a pulse counter, causes the engagement of the rollers for the conveyance of the packs 8 to fixed positions of the roller assembly 7 and the disengagement of those rollers which are beneath the packs in said fixed positions.

As it is seen from the sequence of the various packs shown in FIG.3, when the first pack 8a arrives the photocell 23 is shaded and starts, for example by means of an encoder, the calculation of the amount of advancing of the pack according to its length to reach the rightmost position on the roller assembly, knowing that one revolution of the rollers corresponds to the advancing of a certain number of millimeters. After said positioning the clutches, for example electromagnetic clutches, of the rollers which are beneath the first pack 8a are disengaged, thus stopping their revolution. When the second pack 8b arrives it is detected in the same way by the photocell 23, and the millimeters of advancing are calculated, deducting the length of the first pack 8a, to place this second pack 8b by the side of the first pack 8a. For example if a distance d is required between the second pack 8b and the third pack 8c, the encoder calculates the advancing of said pack 8c deducting the millimeters of said distance d.

The different dispositions wanted for the packs on the roller assembly 7 are prearranged so that the sensor or photocell 23, through an encoder, sends the signals to a properly programmed processor which causes the disengagement of those rollers which are successively beneath the packs, when the latter have reached their final and desired position. Alternatively the distance d between the packs may be achieved in a favourable way, after that the row of packs has formed, by revolving backwards the roller assembly 7 more slowly than during the feeding of the packs, and by engaging the clutches beneath the different rollers according to the necessity in order to generate the distances between the various packs, and controlling said spacing operation through an encoder or a pulse counter. This operation is favourable since it is possible to have a high pack feeding speed on the roller assembly and a good precision of the pack position in the formation of the put down rows. The spacing between the packs is necessary since the packs are of variable size which is not always a submultiple of the size of the pallet while the possibility of crossing the subsequent layers of packs on the palletization stand 12 provides for a greater stability of the pack arrangement. All of this is controlled by a properly programmed processor.

After the formation of a row of packs 8 on the roller assembly 7, the bogie 5 moves automatically bringing the head 11 near to the structure 6 so that a pusher 25 moves horizontally along the guides 26 towards the head 11 which, being provided with a loading plane 27, receives the first row of packs 8 as a consequence of the motion of the pusher 25 according to the arrow C.

After this first step the pusher 25 goes back to its starting position and so does the head 11 going back to the position of FIG.1 above the palletization stand 12. At this moment the loading plane 27, driven by motors not shown in the drawings, moves in the direction of the arrow D, as shown in FIG.4, so that the first row of packs 8 stopping against the surface plate 28 is put down on the stand 12. Said surface plate 28 may move along the guides 29 to reach different positions according to the size of the packs forming the various rows.

As the subsequent rows of packs are formed on the roller assembly 7 the head 11 moves near to the structure 6 to receive successively the rows of packs, and with increasing motion of the head 11 towards the stand 12 the various rows of packs are put down on the stand 12 side by side or at prearranged distances till the whole surface of the stand 12 is filled, thus forming a layer of packs 8 included between the edges 12a and 12b.

As shown in FIG.4, a bar 30, coming down in the direction of the arrow E, pushes the row of packs during their conveyance from the structure 6 to the stand 12. Said motion in the direction of the arrow E is carried out by means of a piston 31 horizontally arranged, as shown in FIG.5, which, through a transmission of the driving belts 32, moves the bar 30 in the direction of the arrow E to push against the packs. The bar 30 is moved in the opposite direction to release the row of packs when it is put down on the stand 12.

The head 11, in addition to the horizontal motion according to the arrow A, also moves vertically according to the double-pointed arrow F, since, as the layers of packs on the palletization stand 12 increase, the head 11 rises in order not to interfere with the layers of packs put down on the stand. Said vertical motion is carried out by means of an electric motor 33 located above the bogie 5, as shown in FIG.1, said motor driving the shaft 34 which, through the belts 35, raises and lowers the head 11 according to the double-pointed arrow F, through the coupling of the rolls 36 fixed to the head 11 and in contact with the two vertical columns 11'.

At the beginning of the roller assembly 7 there is a vertical bar 37 which can be moved along a roller in the two directions according to the double-pointed arrow G, so that the packs 8 may undergo a rotation and thus a different orientation when they engage said bar 37.

As shown in FIG.5, the head 11 is also provided with a horizontal bar 38 integral with the rods 39 of the pistons 40; said bar 38 on its lower surface bears suction means or suckers 41, so that when the latter are lowered, by means of the pistons 40, the separating sheets 10 are picked up, one at a time, from the stand 9. A piston 42 rotates, through a lever 43, a bar 44 and consequently the stops 45 fixed thereto, from the position of FIG.5 to the position indicated by broken lines in FIG.7.

The equipment is programmed so that, during the motion of the head 11 towards the structure 6, the various suckers 41 and the stops 45 associated therewith are in the position I, as shown in FIGS.5 and 6; while when the first row of packs 8 of the subsequent layer is moved on the loading plane 27, the pistons 40 lower the suckers 41 on the top separating sheet 10 laying on the stand 9 and the piston 42 also rotates the stops 45 till they reach the positions III and IV of FIG.6, so that the sheet is seized between the suckers and the stops and therefore it is moved on top of the complete layer put down on the stand 12 together with the first row of packs of the subsequent layer on said stand 12. First the loading plane 27 reaches the end of the stand 12 or an intermediate position and puts down the separating sheet 10, then the loading plane 27 reaches the beginning of the stand 12 and puts down the first row of packs of the subsequent layer. The laying of the separating sheet on top of the layer of packs takes place since the pistons 40 and 42 move their rods in the direction opposite to that of picking up the sheet, i.e. raising the suckers 41 and the stops 45 in the position I, so that the front edge 10a of each sheet 10 picked up by the suckers 41 is released by the front edge 12b of the layer of packs put down on the stand 12.

As shown in FIG.7, a spring 46 is located around the stem of each sucker, interposed between the bar 38 and a little block 47 fixed to said stem, so that said spring assures the return of the sucker from the position of blockage IV to the rest position I.

Each vertical bar 21 (FIG.2) is connected to a device capable, through the coupling of a rack 48 and a cogwheel 49, of raising and lowering, according to the double-pointed arrow H, the stand 9 so that when the separating sheets 10 are running out the stand 9 is raised and on the contrary it is lowered when a new stack of separating sheets is put thereon. In this way the suckers 41, which have a fixed vertical travel, always surely pick up the top separating sheet of the stack.

The stand 9 slides in its vertical motion along the fixed guides 50 while the guide 51 may be adjusted according to the size of the separating sheets 10. It should be noted as an important characteristic that the stand 9 for the separating sheets 10 is located under the roller assembly 7 where the row of packs is formed. This arrangement provides for a remarkable room saving in the use of the equipment. Said arrangement is very important in order to build an equipment of reduced size.

As it may be noted from the preceding description the advantages of this invention are the following:

-easier programmed arrangement of the packs on the roller assembly so that there is no need for manual intervention in said arrangement -reduced overall dimensions of the equipment since the mobile head of the equipment includes both the loading plane of the rows of packs and the sucker device to pick up the separating sheets, and thanks to the location of the stand of the latter under the roller assembly -consequent reduction of the operating time of the equipment, owing to both the said programming and the fact that the first row of packs of the layer subsequent to the one already put down on the palletization stand is moved together with the separating sheet on top of the complete layer of packs already put down.

Obviously additions and/or modifications may be produced to the above described method and equipment without exceeding the limits of the protection of the invention as hereinafter claimed.

We claim:

1. An equipment for loading packs of sheets on a palletization stand comprising an assembly (7) which successively positions packs (8) in a row; means (25) transferring each successive row of packs (8) from the assembly (7) to a loading plane (27) of a head (11); means (5) moving said head (11) successively into position to form successive rows on a palletization stand (12), until the rows of packs (8) form a layer of packs, said head (11) besides bearing the loading plane (27) on which are successively pushed the rows of packs (8) from the assembly (7) also bears a row of suction means (41) capable of picking up an edge (10a) of a separating sheet (10) characterized in that said suction means (41) move the separating sheet over a just completed layer of packs together with a further row of packs (8) held by said loading plane to position the separating sheet and the further row of packs over the top layer of packs (8) already on said palletization stand (12).

2. An equipment according to claim 1, characterized in that it includes: a motor (14) driving said head (11) horizontally from a position adjacent to said assembly (7) to receive the rows of packs (8) to different positions above the palletization stand (12) in different paths according to the size of each single row of packs and to position said rows on the palletization stand (12); and a motor (33) which moves said head (11) vertically to put down successive layers of packs (8) on the palletization stand (12).

3. An equipment according to claim 1, characterized in that the separating sheets (10) are laid on a moving plane (9), located under the assembly (7) where the rows of packs are formed, which is progressively moved upwards as the sheets (10) are picked up by said suction means (41).

4. An equipment according to claim 1, characterized in that level with the suction means (41) there are stops (45) mounted on a bar (44) which is driven by drive means (42) so that said stops (45) are moved towards the suction means (41) and the latter towards said stops (45) so that each separating sheet (10) is securely retained between the suction means (41) and the stops (45) during the transfer of the sheet (10) towards the palletization stand (12).

5. An equipment according to claim 3, characterized in that level with the suction means (41) there are stops (45) mounted on a bar (44) which is driven by drive means (42) so that said stops (45) are moved towards the suction means (41) and the latter towards said stops (45) so that each separating sheet (10) is securely retained between the suction means (41) and the stops (45) during the transfer of the sheet (10) towards the palletization stand (12).

6. An equipment according to claim 1, characterized in that said head (11) includes: a motor to produce horizontal motion of said loading plane (27) capable of putting down successively the rows of packs; driving means (31, 32) to produce upwards and downwards motion of a pushing bar (30) onto the packs (8) during transfer of the rows of packs (8) onto the palletization stand (12); and a check member (38) sliding on the loading plane (27) provided with adjustable positioning according to the size of the packs (8).

7. An equipment according to claim 3, characterized in that said head (11) includes: a motor to produce horizontal motion of said loading plane (27) capable of putting down successively the rows of packs; driving means (31, 32) to produce upwards and downwards motion of a pushing bar (30) on the packs (8) during transfer of the rows of packs (8) onto the palletization stand (12); and a check member (38) sliding on the loading plane (27) provided with adjustable positioning according to the size of the packs (8).

8. An equipment for loading packs of sheets on a palletization stand comprising a roller assembly (7) which conveys and positions successively rows of packs (8); a pusher (25) transferring rows of the packs (8) from the roller assembly (7) to a loading plane (27) of a head (11); means (5) moving said head (11) successively to position on a palletization stand (12), the rows of packs (8) to form a layer of packs, said head (11) besides bearing the loading plane (27) onto which are successively pushed the rows of packs (8) from the roller assembly (7) also bears a row of suction means (41) capable of picking up an edge (10a) of a separating sheet (10) characterized in that said suction means (41) move the separating sheet over a just completed layer of packs together with a further row of packs (8) held by said loading plane to position the separating sheet and a further row of packs over the top layer of packs (8) already on said palletization stand (12).

9. An equipment according to claim 8, characterized in that the rollers of the roller assembly (7) are selectively powered so that they may revolve backwards, each one with a selected motion, to form one or more spaces (d) between the packs or groups of packs.

10. An equipment according to claim 8, characterized in that it includes: a motor (14) driving said head (11) horizontally from a position adjacent to said roller assembly (7) to position successively the rows of packs (8) in different positions above the palletization stand (12) with different paths according to the size of each single row of packs and a motor (33) which moves said head (11) vertically to put down successive layers of packs (8) on the palletization stand (12).

11. A method for loading packs of sheets on a palletization stand, comprising the following steps:

conveying the packs (8) by means of a conveyor (7) which conveys and positions successively rows of packs (8), horizontally transferring each row of packs (8) by means of a pusher (25) from the conveyor (7) to a loading plane (27) of a head (11) which moves successively relative to palletization stand (12), the head thus forming a layer of the rows of packs, and transferring a separating sheet (10) onto a complete layer of packs (8) previously put down onto said palletization stand (12), characterized in that the step of transferring said separating sheet (10) takes place together with the transfer of a further row of packs (8) held by said head to position the separating sheet and the further row of packs cover the top layer of packs already on said palletization stand (12).

* * * * *